United States Patent [19]
Loustaunau

[11] Patent Number: 5,421,217
[45] Date of Patent: Jun. 6, 1995

[54] HAND-OPERATED ACCELERATION/DECELERATION CONTROL DEVICES

[76] Inventor: Ernest Loustaunau, 3872 Madison, Riverside, Calif. 92504

[21] Appl. No.: 172,258

[22] Filed: Dec. 23, 1993

[51] Int. Cl.⁶ .................. G05G 1/14; G05G 13/00
[52] U.S. Cl. ........................... 74/482; 74/481; 403/13; 403/331
[58] Field of Search ............... 74/481, 482, 544, 532; 403/13, 331; 254/DIG. 5

[56] References Cited

U.S. PATENT DOCUMENTS

| | | | |
|---|---|---|---|
| 2,138,911 | 12/1938 | Evans et al. | 74/532 X |
| 2,481,966 | 9/1949 | Zivi | 74/481 |
| 2,930,250 | 3/1960 | Atran | 74/482 |
| 2,960,885 | 11/1960 | Donaldson | 74/532 X |
| 3,065,647 | 11/1962 | Whitmore | 74/481 |
| 3,125,898 | 3/1964 | Maples et al. | 74/532 |
| 3,373,628 | 3/1968 | Lake et al. | 74/544 X |
| 4,424,723 | 1/1984 | Gockel | 74/482 |

Primary Examiner—Allan D. Herrmann

[57] ABSTRACT

Hand-operated control devices for a motor vehicle comprising a shaft having a first upper end and a second lower end, the shaft having a length adapted to extend from a pedal of a vehicle to a location within the reach of a driver; coupling means for coupling the second lower end of the shaft to a pedal of a vehicle such that the shaft is rotatable and movable with respect to the second end, the coupling means adapted so that it may be removed from the pedal without using any tools; and a handle coupled to the first upper end of the shaft, enabling a driver to apply downward pressure from the handle through the shaft and coupling means in order to depress a pedal. Also included is a second device couplable to a second pedal of a motor vehicle for remote operation of the second pedal.

2 Claims, 4 Drawing Sheets

HAND-OPERATED ACCELERATION/DECELERATION CONTROL DEVICES

BACKGROUND OF THE INVENTION

1. Field of the Invention

The present invention relates to hand-operated acceleration deceleration control devices and more particularly pertains to hand-operated control devices which may be used for controlling the acceleration and/or deceleration of a motor vehicle.

2. Description of the Prior Art

The use of hand-operated control devices for controlling the acceleration/deceleration of motor vehicles are known in the prior art. More specifically, devices heretofore devised and utilized for the purpose of controlling the acceleration and/or deceleration of motor vehicles are known to consist basically of familiar, expected and obvious structural configurations, notwithstanding the myriad of designs encompassed by the crowded prior art which have been developed for the fulfillment of countless objectives and requirements.

For example, hand-operated control devices are illustrated in U.S. Pat. Nos. 4,438,835 to Dowden; 4,998,983 to Ruprecht; and 5,025,905 to Lenz. These patents describe complex control devices that are permanently fixed within the driver's compartment of a motor vehicle.

U.S. Pat. Nos. 3,537,328 to Allen and 4,993,509 to Howell also describe complex devices for controlling a motor vehicle that are primarily and permanently fixed to the undercarriage of a motor vehicle.

While these devices fulfill their respective, particular objective and requirements, the aforementioned patents do not describe a simple hand-operated device for controlling the acceleration and/or deceleration of a motor vehicle which includes a shaft having a first end and a second end, the shaft having a length adapted to extend from an acceleration pedal of a vehicle to a location within the reach of a driver, a coupling means for coupling the second end of the shaft to an acceleration pedal of a vehicle such that the shaft is rotatable and movable with respect to the second end, the coupling means adapted so that it may be removed from the pedal without using any tools, and a handle coupled to the first end of the shaft, enabling a driver to apply downward pressure from the handle through the shaft and coupling means in order to depress an acceleration pedal. Also included is a second device couplable to a second pedal of a motor vehicle for remote operation of the second pedal.

Furthermore, the aforementioned patents do not describe a device that may be quickly and easily attached and detached to pedals of motor vehicles. For example, the present invention could be used by a driver who has injured his or her right leg, ankle, or foot. This device would enable the driver to continue to operate his or her vehicle without having to spend the time and effort to have a more complex acceleration/deceleration control device installed. This device could also be used by an uninjured driver. The driver could use this device so that he or she could rest or stretch his or her right leg while on a long distance journey.

In this respect, the device, according to the present invention substantially departs from the conventional concepts and designs of the prior art, and in doing so provides a hand-operated control device primarily developed for the purpose of controlling the acceleration/deceleration of a motor vehicle.

Therefore, it can be appreciated that there exists a continuing need for a new and improved hand-operated acceleration/deceleration control device. In this regard, the present invention substantially fulfills this need.

SUMMARY OF THE INVENTION

In the view of the foregoing disadvantages inherent in the known types of devices now present in the prior art, the present invention provides an improved construction wherein the same can be utilized for controlling the acceleration and/or deceleration of a motor vehicle by hand. As such., the general purpose of the present invention, which will be described subsequently in greater detail, is to provide a new and improved device which has all the advantages of the prior art and none of the disadvantages.

To attain this, the present invention essentially comprises a hand-operated acceleration control device for a motor vehicle comprising a plate having a top face, a bottom face, and four sides; three elongated guides, each guide attached to a side of the plate and extending downward to define a space between the sides and bottom face for receipt of an acceleration pedal, the periphery of the space having three closed sides and one open side, the guides adapted to secure an acceleration pedal within the space when the pedal is moved into the space from the open side, the guides further adapted to release an acceleration pedal from the space when an acceleration pedal is moved out of the space from the side open side; a shaft having a first end and a second end, the shaft having a length adapted to extend from an acceleration pedal to a location within the reach of a driver; a ball-bearing assembly coupling the second end of the shaft to the top face of the plate such that the shaft is rotatable about its axis and is essentially perpendicular with respect to the plate; a wooden handle coupled to the first end of the shaft, enabling a driver to apply downward pressure from the handle through the shaft, ball bearing assembly, and plate in order to depress an acceleration pedal. Also included is a second device couplable to a second pedal of a motor vehicle for remote operation of the second pedal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved hand-operated acceleration/deceleration control devices for motor vehicles which have all the advantages of the prior art or devices of a similar nature and none of the disadvantages.

It is another object of the present invention to provide new and improved hand-operated acceleration/deceleration control devices for motor vehicles which may be easily and efficiently manufactured and marketed.

It is a further object of the present invention to provide new and improved hand-operated control devices for motor vehicles which are of durable and reliable construction.

An even further object of the present invention is to provide new and improved hand-operated acceleration/deceleration control devices for motor vehicles which are susceptible of a low cost of manufacture with regard to both materials and labor, and which accordingly are then susceptible of low prices of sale to the consuming public, thereby making such hand-operated control devices for motor vehicles economically available to the buying public.

Still yet another object of the present invention is to provide new and improved hand-operated acceleration/deceleration control devices for motor vehicles which provide in the apparatuses and methods of the prior art some of the advantages thereof, while simultaneously overcoming some of the disadvantages normally associated therewith.

Still another object of the present invention is to install or remove new and improved hand-operated control devices quickly and without using any tools.

Yet another object of the present invention is to control the acceleration/deceleration of a motor vehicle with apparatus which can be adjusted readily by a driver.

Lastly, it is an object of the invention to provide hand-operated control devices for motor vehicles comprising a shaft having a first upper end and a second lower end, the shaft having a length adapted to extend from a pedal of a vehicle to a location within the reach of a driver; coupling means for coupling the second lower end of the shaft to a pedal of a vehicle such that the shaft is rotatable and movable with respect to the second end, the coupling means adapted so that it may be removed from the pedal without using any tools; and a handle coupled to the first upper end of the shaft, enabling a driver to apply downward pressure from the handle through the shaft and coupling means in order to depress a pedal. Also included is a second device couplable to a second pedal of a motor vehicle for remote operation of the second pedal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
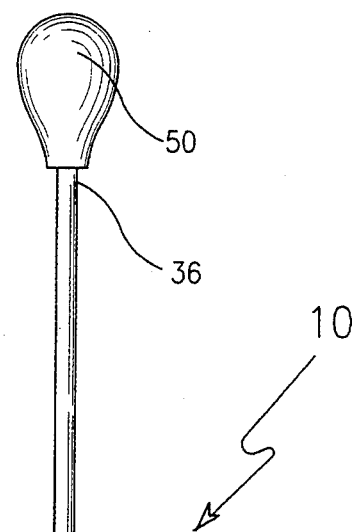
FIG. 1 is a front elevational view of the hand-operated acceleration control device constructed in accordance with the principles of the present invention.
Figure 2:
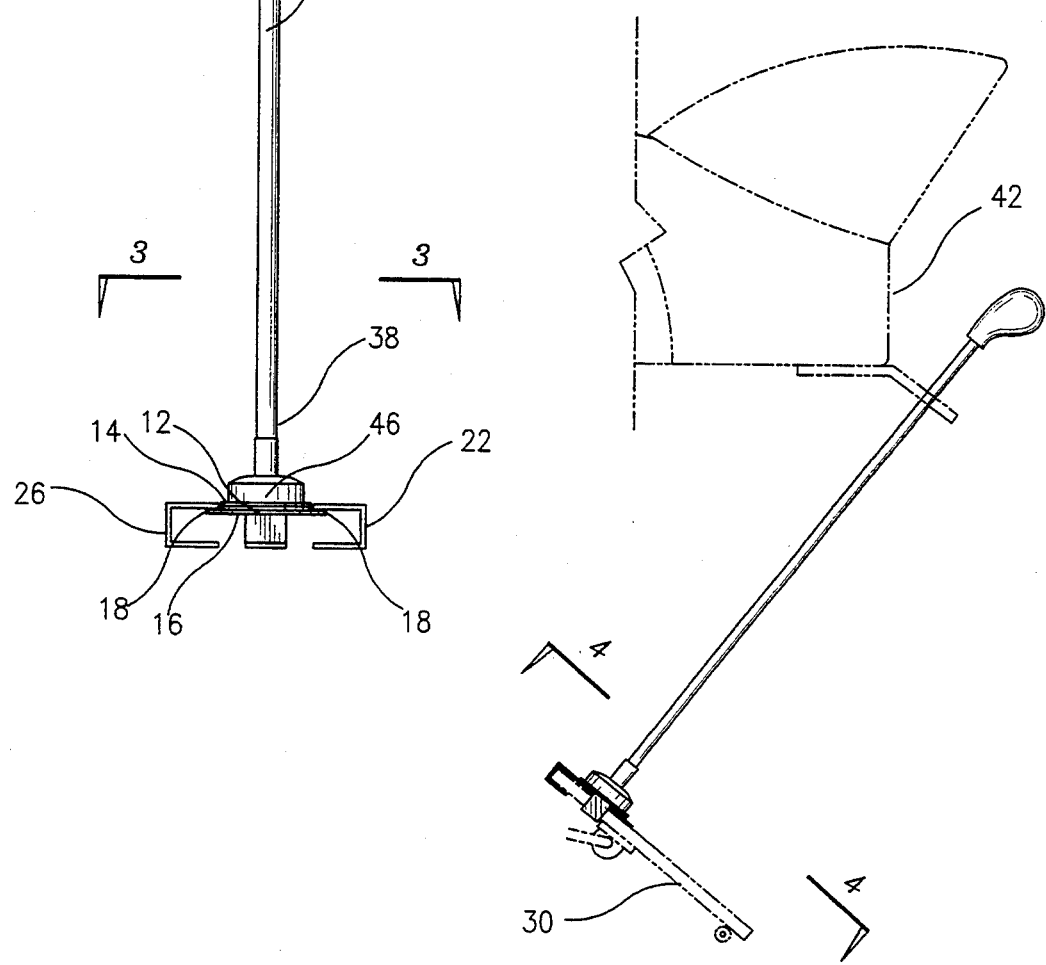
FIG. 2 is a side elevational view of the device of FIG. 1 coupled to the gas pedal of a car.
Figure 3:
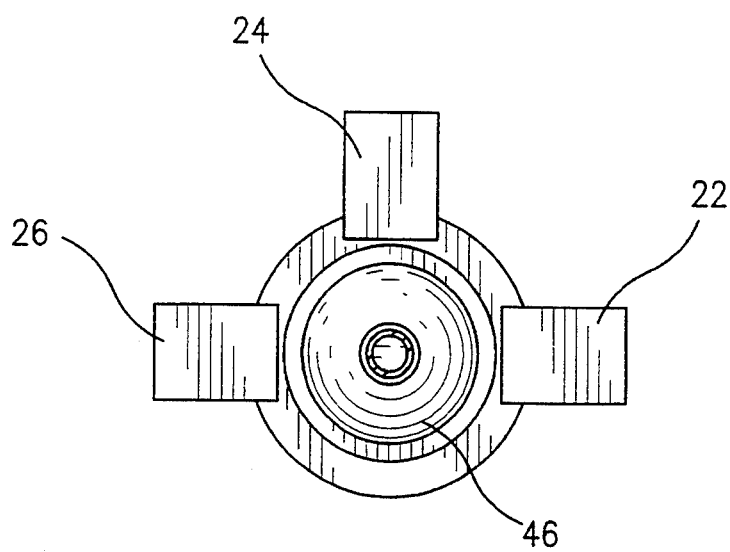
FIG. 3 shows in greater detail the apparatus for coupling the shaft to the gas pedal of FIG. 2.
Figure 4:
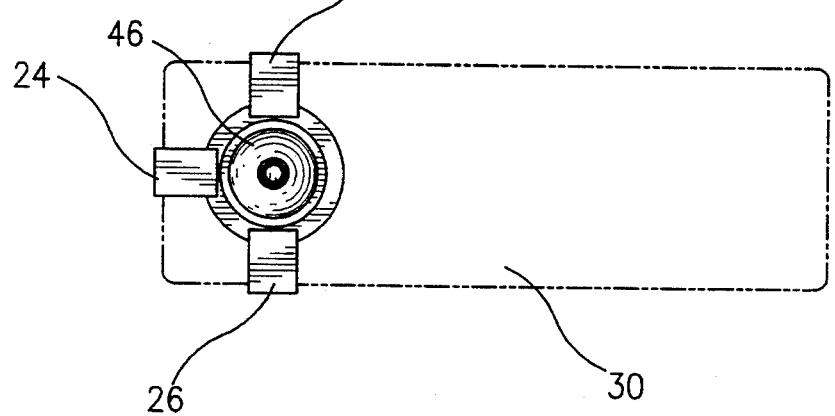
FIG. 4 is a top plan view of the coupling apparatus of the print Figures secured to a gas pedal.
Figure 5:
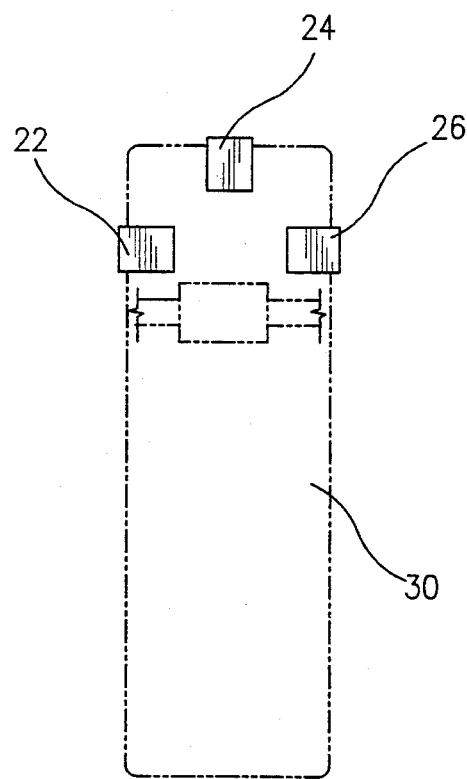
FIG. 5 is a bottom view of the coupling apparatus similar to FIG. 4 but showing a bottom view thereof.

With reference now to the drawings, and in particular, to FIGS. 1 through 5 thereof, and to FIG. 6 for an alternate embodiment, a new and improved hand-operated control device for a motor vehicle embodying the principles and concepts of the present invention and generally designated by the reference number 10 will be described.

The hand-operated acceleration control device 10 for controlling the acceleration of a motor vehicle includes a plate 12. The plate has a top face 14, a bottom face 16, and four sides 18. Three elongated guides 22, 24 and 26 are attached to the sides of the plate.

Each guide is attached to a side of the plate and extends downward to define a space between the sides and bottom face for receipt of an acceleration pedal 30. The periphery of the space has three closed sides and one open side. The guides 22, 24 and 26 are adapted to secure to the upper edge of an acceleration pedal 30 within the space when the pedal is moved into the space from the open side. The guides are further adapted to release an acceleration pedal from the space when an acceleration pedal is moved out of the space from the open side.

By attachment to the top of the pedal, the device cannot inadvertently slide off of the pedal. The device 10 further includes a shaft 34. The shaft has a first or upper end 36 and a second or lower end 38. The length of the shaft is adapted to extend from an acceleration pedal 30 to a location within the reach of a driver. Note FIG. 2 which shows the relationship with a pedal 30 and dashboard 42. The plate 12 and guides 22, 24 and 26 are preferably fabricated of a rigid material such as metal or plastic. This allows such components to have a long life and retain their shape for dependable usage over the life of the device and vehicle.

A ball bearing assembly 46 couples the second or lower end 38 of the shaft 34 to the top face of the plate 12. In this arrangement, the shaft 34 is rotatable about its axis for rotation with respect to the pedal 30. In addition, the shaft 34 is essentially perpendicular with respect to the plate for efficient transmission of forces by the driver.

A wooden handle 50 is removably coupled by associated threads to the first or upper end of the shaft 34. This allows changing of the handle at the discretion of the user or users of the vehicle. The handle 50 enables a driver to apply downward pressure from the handle 50 through the shaft 34, ball bearing assembly 46, and plate 12 in order to depress an acceleration pedal.

Figure 6:
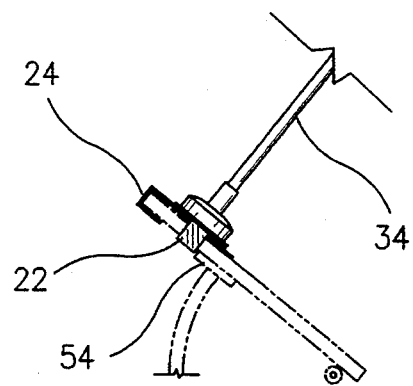
FIG. 6 is a view similar to FIG. 2 but illustrating an alternate embodiment of the invention as applied to a brake pedal rather than an acceleration or gas pedal.

Shown in FIG. 6 is an alternate embodiment of the invention. In the alternate embodiment, the apparatus is essentially the same except that it is coupled to a brake pedal 54, rather than the acceleration gas pedal 30 of the prior embodiment.

Figure 7:
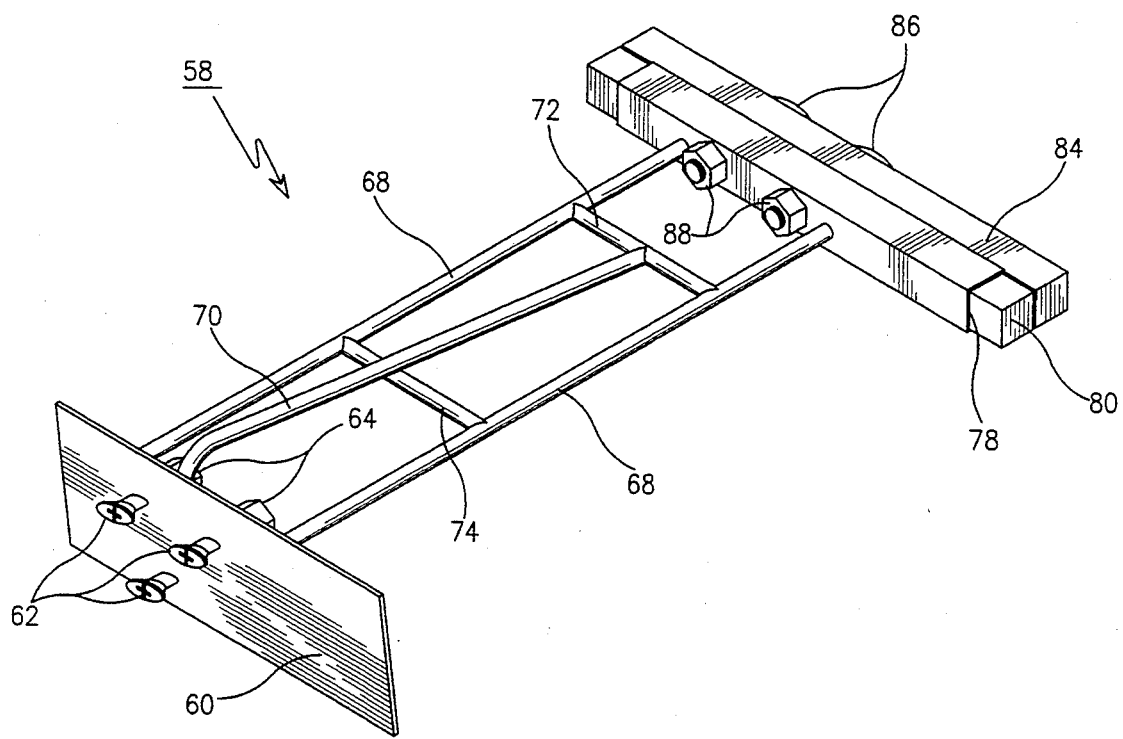
FIG. 7 is a perspective illustration of an alternate embodiment of a device for applying pressure to a brake pedal.

Another alternate embodiment of the invention is shown in FIG. 7. In this embodiment, an alternate device is used for the application of pressure to a brake pedal. This apparatus includes a lower plate 60 having a plurality of apertures. Such plate is positioned directly onto the brake pedal of a vehicle. Passing through the apertures of the plate as well as apertures drilled in the brake pedal are bolts 62 with associated securement nuts 64. A pair of laterally spaced long rods 68 extend perpendicularly upwardly from the upper surface of the plate 60. An intermediate short rod 70 has its lower end bent and secured to a central extent of the plate 60 and an upwardly extending portion. The upwardly extending portion is welded to a short brace 72 coupling the long rods adjacent the their upper ends. A further short brace 74 couples the long rods adjacent to their lower ends. The upper ends of the long rods 68 are welded to the lower surface of a channel tube 78. The channel tube 78 has an interior wood insert 80 for rigidity. A wooden handle 84 extends across the upper extent of the channel tube for being grasped by the user and pushed downwardly to apply pressure to the brake for stopping the car. Bolts 86 extend through aligned apertures in the wood handle 84 and channel tube 78 and are secured there by blocking nuts 88.

The FIG. 7 embodiment is a device which may be used in association with the device of FIGS. 1 through 6, one for the gas pedal and one for the brake pedal. The two devices may, however, be used independently of each other. Together they function in systems configuration for extending the utility of motor vehicles.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A hand operated acceleration control device for a motor vehicle comprising:
    a shaft having a first upper end and a second lower end, the shaft having a length adapted to extend from a pedal of a vehicle to a location within the reach of a driver;
    a ball-bearing assembly coupled to the second lower end of the shaft;
    a plate coupled to the ball-bearing assembly;
    three elongated guides coupled to the plate for relievable securement to the pedal; and
    a handle coupled to the first upper end of the shaft for enabling a driver to apply downward pressure in order to depress the pedal.

2. A hand-operated acceleration control device for a motor vehicle comprising:
    a plate having a top face, a bottom face, and four sides;
    three elongated guides, each guide attached to a side of the plate and extending downward to define a space between the sides and bottom face for receipt of an acceleration pedal, the periphery of the space having three closed sides and one open side, the guides adapted to secure an acceleration pedal within the space when the pedal is moved into the space from the open side, the guides further adapted to release an acceleration pedal from the space when an acceleration pedal is moved out of the space from the side open side;
    a shaft having a first end and a second end, the shaft having a length adapted to extend from an acceleration pedal to a location within the reach of a driver;
    a ball bearing assembly coupling the second end of the shaft to the top face of the plate such that the shaft is rotatable about its axis and is essentially perpendicular with respect to the plate;
    a wooden handle coupled to the first end of the shaft, enabling a driver to apply downward pressure from the handle through the shaft, ball bearing assembly, and plate in order to depress an acceleration pedal.

* * * * *